United States Patent
Hahn et al.

(10) Patent No.: US 10,144,819 B2
(45) Date of Patent: Dec. 4, 2018

(54) RUBBER COMPOSITION CONTAINING FIBRILLATED ARAMID FIBER MICROPULP WITH PRE-HYDROPHOBATED SILICA REINFORCEMENT AND TIRE WITH COMPONENT

(71) Applicant: The Goodyear Tire & Rubber Company, Akron, OH (US)

(72) Inventors: Bruce Raymond Hahn, Hudson, OH (US); George Jim Papakonstantopoulos, Medina, OH (US); Benjamin John Iverson, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 154 days.

(21) Appl. No.: 15/464,435

(22) Filed: Mar. 21, 2017

(65) Prior Publication Data

US 2017/0283598 A1 Oct. 5, 2017

Related U.S. Application Data

(60) Provisional application No. 62/318,339, filed on Apr. 5, 2016.

(51) Int. Cl.

| | |
|---|---|
| *C08L 7/00* | (2006.01) |
| *C08K 3/013* | (2018.01) |
| *C08L 15/00* | (2006.01) |
| *B60C 1/00* | (2006.01) |
| *C08K 3/06* | (2006.01) |
| *C08K 3/22* | (2006.01) |
| *C08K 5/31* | (2006.01) |
| *C08K 5/47* | (2006.01) |
| *C08K 5/548* | (2006.01) |
| *C08L 77/10* | (2006.01) |
| *C08K 9/04* | (2006.01) |
| *C08L 91/00* | (2006.01) |
| *C08L 91/06* | (2006.01) |

(52) U.S. Cl.
CPC .............. *C08L 7/00* (2013.01); *B60C 1/0016* (2013.01); *C08K 3/06* (2013.01); *C08K 3/22* (2013.01); *C08K 5/31* (2013.01); *C08K 5/47* (2013.01); *C08K 5/548* (2013.01); *C08L 15/00* (2013.01); *C08L 77/10* (2013.01); *C08K 3/013* (2018.01); *C08K 9/04* (2013.01); *C08L 91/00* (2013.01); *C08L 91/06* (2013.01); *C08L 2205/03* (2013.01); *C08L 2205/16* (2013.01)

(58) Field of Classification Search
None
See application file for complete search history.

(56) References Cited

U.S. PATENT DOCUMENTS

| | | | | |
|---|---|---|---|---|
| 4,871,004 A | * | 10/1989 | Brown | B60C 9/12 152/209.4 |
| 5,576,104 A | * | 11/1996 | Causa | B60C 1/0016 152/450 |
| 2003/0114641 A1 | * | 6/2003 | Kelly | C09D 7/65 528/501 |
| 2004/0173295 A1 | * | 9/2004 | Zanzig | B60C 1/00 152/209.5 |
| 2007/0066744 A1 | * | 3/2007 | Weydert | B60C 1/0016 524/493 |
| 2017/0283598 A1 | * | 10/2017 | Hahn | C08L 7/00 |

* cited by examiner

*Primary Examiner* — Peter A Salamon
(74) *Attorney, Agent, or Firm* — Henry C. Young, Jr.

(57) ABSTRACT

This invention relates to a rubber composition comprised of at least one diene-based elastomer and rubber reinforcement comprised of fibrillated aramid fiber micropulp and reinforcing filler comprised of pre-hydrophobated precipitated silica. Such fibrillated aramid micropulp is comprised of micronized fibrillated aramid fiber pulp. Such pre-hydrophobated precipitated silica is comprised of precipitated silica pre-treated with at least one of bis(3-trialkylsilylalkyl) polysulfide, alkoxyorganomercaptosilane, optionally together with an alkylsilane. The invention further relates to such rubber composition wherein said reinforcing filler is comprised of a combination of said pre-hydrophobated precipitated silica as a precipitated silica pre-treated with an alkoxyorganomercaptosilane and a precipitated silica wherein said pre-hydrophobated precipitated silica and said precipitated silica are both hydrophobated in situ within the rubber composition with a bis(3-trialkoxysilylalkyl) polysulfide. The invention further relates to tires containing at least one component comprised of such rubber composition such as for example a tire tread.

20 Claims, No Drawings

US 10,144,819 B2

RUBBER COMPOSITION CONTAINING FIBRILLATED ARAMID FIBER MICROPULP WITH PRE-HYDROPHOBATED SILICA REINFORCEMENT AND TIRE WITH COMPONENT

FIELD OF THE INVENTION

This invention relates to a rubber composition comprised of at least one diene-based elastomer and rubber reinforcement comprised of fibrillated aramid fiber micropulp and reinforcing filler comprised of pre-hydrophobated precipitated silica. Such fibrillated aramid fiber micropulp is comprised of micronized fibrillated aramid fiber pulp. Such pre-hydrophobated precipitated silica is comprised of precipitated silica pre-treated with at least one of bis(3-trialkylsilylalkyl) polysulfide, alkoxyorganomercaptosilane, optionally together with an alkylsilane. The invention further relates to such rubber composition wherein said reinforcing filler is comprised of a combination of said pre-hydrophobated precipitated silica as a precipitated silica pre-treated with an alkoxyorganomercaptosilane and a precipitated silica wherein said pre-hydrophobated precipitated silica and said precipitated silica are both hydrophobated in situ within the rubber composition with a bis(3-trialkoxysilylalkyl) polysulfide. The invention further relates to tires containing at least one component comprised of such rubber composition such as for example a tire tread.

BACKGROUND OF THE INVENTION

Rubber compositions for tire components, such as for example tire treads, are often comprised of at least one diene-based elastomer and reinforcing filler reinforcement comprised of rubber reinforcing carbon black and precipitated silica. The rubber composition usually contains a silica coupler to aid in coupling the precipitated silica to the diene-based elastomer(s).

Such rubber compositions may further contain short, discontinuous fiber reinforcement. Such short, discontinuous fiber reinforcement may comprise, for example, fibrillated aramid fibers comprised of a trunk portion containing numerous short fibrils extending outwardly from its trunk having diameters substantially smaller than its trunk diameter. Exemplary of such fibrillated aramid are various Kevlar® fibers (e.g. Kevlar® aramid pulp) from the E. I. DuPont Company.

Because of the fibrillated configuration of the short aramid fibers, such fibrillated aramid fibers have been observed to tend to clump together in a form of a pulp which is difficult to adequately disperse within a rubber composition without forming a plurality of domains comprised of clumps of the fibrillated aramid fiber pulp within the rubber composition.

Such fibrillated aramid fiber pulp has been described in U.S. Pat. No. 4,871,004 (which is incorporated herein in its entirety) as being comprised of aramid fibers composed of a trunk portion having a length of from about 0.2 to about 5 mm (micrometers), an aspect ratio of greater than 100 containing numerous fibrils extending outwardly from its trunk portion with diameters substantially smaller than its trunk diameter and having a surface area of from about 4 to about 20 square meters per gram.

Fibrillated aramid micropulp has been described in U.S. Patent Publication No. 2003/0114641 (which is incorporated herein in its entirety) as fibrillated aramid fiber pulp treated (referred to herein as being micronized to fracture its trunk portion and to thereby reduce the average length of its trunk portion) to form a fibrillated aramid fiber micropulp thereof to provide fibrillated aramid fiber micropulp intended to be more readily dispersible in a rubber composition to thereby promote better dispersion of the micropulp within a rubber composition and more adequate fiber reinforcement of the rubber composition.

It is envisioned herein that such fibrillated aramid fiber micropulp may be comprised of micronized fibrillated aramid fibers having a trunk portion reduced in length by a factor, for example, in a range of from about 4 to about 50 times from its aforesaid fibrillated aramid fiber length and a surface area increased by a factor, for example, in a range of from about 10 to about 100 times the surface area of its aforesaid fibrillated aramid fiber.

For this invention, it is desired to provide a rubber composition comprised of at least one diene-based elastomer with a combination of such fibrillated aramid fiber micropulp rubber reinforcement with rubber reinforcing filler comprised of pre-hydrophobated precipitated silica.

For such pre-hydrophobated precipitated silica it is proposed to provide a precipitated silica as a pre-hydrophobated precipitated silica (hydrophobated prior to its addition to the rubber composition) as a precipitated silica pre-treated with at least one of bis(3-alkoxysilylalkyl) polysulfide and alkoxyorganomercaptosilane. Such pre-treatment may optionally also include an alkylsilane.

Because the precipitated silica is generally hydrophilic in nature, thereby tending to clump together within the rubber composition and become challenging to adequately disperse within the rubber composition, such pre-treatment of the precipitated silica may be desirable to thereby pre-hydrophobate the precipitated silica and hereby enable it to more readily disperse within the rubber composition.

One intended purpose of providing said fibrillated aramid micropulp reinforcement together with the pre-hydrophobated precipitated silica filler reinforcement is to increase the storage modulus (G') at low strain of the sulfur cured rubber composition containing the pre-hydrophobated precipitated silica desirably without significantly increasing the hysteresis of the cured rubber composition as evidenced by not significantly changing its tan delta physical property.

In the description of this invention, the terms "compounded" rubber compositions and "compounds", where used, refer to the respective rubber compositions which have been compounded with appropriate compounding ingredients. The terms "rubber" and "elastomer" may be used interchangeably unless otherwise indicated. The amounts of materials are usually expressed in parts of material per 100 parts of rubber by weight (phr).

DISCLOSURE AND PRACTICE OF THE INVENTION

In accordance with this invention a rubber composition is provided comprised of, based on parts by weight per 100 parts by weight rubber (phr):
  (A) at least one conjugated diene-based elastomer,
  (B) rubber reinforcement comprised of:
    (1) about 0.1 to about 20, alternately from about 0.5 to about 5, phr of fibrillated aramid fiber micropulp, and
    (2) about 40 to about 120, alternately from about 50 to about 100, phr of reinforcing filler comprised of rubber reinforcing carbon black and pre-hydrophobated precipitated silica comprised of from about 3 to about 45, alternately from about 3 to about 10, phr of said rubber reinforcing carbon black;

wherein said pre-hydrophobated precipitated silica is precipitated silica pre-reacted with at least one of bis(3-trialkoxysilylalkyl) polysulfide having an average of from 2 to about 4 connecting sulfur atoms in its polysulfidic bridge, and alkoxyorganomercaptosilane and optionally an alkylsilane;

wherein said fibrillated aramid fiber micropulp has a volume average length in a range of from about 0.01 to about 100, alternately from about 0.1 to about 10, mm (micrometers) and an average surface area in a range of from about 15 to about 500, alternately from about 30 to about 100, square meter per gram.

In one embodiment, said fibrillated aramid fiber micropulp is comprised of a fibrillated aramid fiber pulp comprised of a trunk portion containing a plurality of fibrils extending from its trunk wherein it's the pulp has micronized to reduce the length of its trunk and to increase its average surface area.

In one embodiment, said bis(3-trialkoxysilylorgano) polysulfide is comprised of bis(3-triethoxysilylpropyl) polysulfide.

In one embodiment, said reinforcing filler may contain up to about 50 percent, alternately up to about 20 percent precipitated silica (precipitated silica which is not pre-hydrophobated.

In one embodiment, said reinforcing filler may be comprised of up to about 50 percent, alternately up to about 20 percent, of precipitated silica (which is not a pre-hydrophobated silica) wherein said pre-hydrophobated precipitated silica is precipitated silica pre-treated with said alkoxyorganomercaptosilane and both of said precipitated silica and said pre-hydrophobated precipitated silica are hydrophobated in situ within the rubber composition with said bis(3-trialkoxysilylorgano) polysulfide.

In this manner, said filler reinforcement is comprised of a combination of pre-hydrophobated precipitated silica with an alkoxyorganomercaptosilane and precipitated silica subsequently hydrophobated together in situ within the rubber composition with a bis(3-trialkoxysilylorgano) polysulfide.

In additional accordance with this invention, a tire is provided having a component comprised of said rubber composition, particularly where said rubber composition is a sulfur cured rubber composition.

In additional accordance with this invention, a tire is provided having a tread comprised of said rubber composition, particularly where said rubber composition is a sulfur cured rubber composition.

One significant aspect of this invention is to provide better elastomer/filler (precipitated silica filler) interaction and better bonding between precipitated silica and diene-based elastomer by combining a pre-hydrophobated precipitated silica with an alkoxyorganomercaptosilane followed by post hydrophobation of the already pre-hydrophobated precipitated silica in situ within the rubber composition with a bis(3-trialkoxysilylorgano) polysulfide to promote dispersion of the precipitated silica within the fibrillated aramid fiber micropulp containing rubber composition and to also promote stronger bonding between elastomer and reinforcing filler (the precipitated silica) filler to thereby promote, for example, better abrasion resistance (e.g. better treadwear resistance), and to also promote, for example, lower hysteresis (higher rebound physical property) for the tread rubber composition.

This aspect is believed to be a significant departure from past practice in the case of a tire tread component.

The aforesaid U.S. Patent Publication No. 2003/0114641 provides a process for producing micropulp, particularly aramid fiber based micropulp, by mixing the fiber with a medium comprised of a liquid component and a solid component and agitating the mixture to transform the fibers into a pulp where the pulp is thereafter separated from said medium. In such process, it is envisioned herein that the aforesaid trunk portion of the aramid fiber is broken, or entruncated, in a sense of reducing its length. It is further envisioned that the ends of the entruncated fiber may be available with which said pre-hydrophobated silica may interact to bond and thereby promote stabilization of the fibrillated aramid fiber micropulp within the rubber composition and to aid in promoting rubber reinforcement for the rubber composition.

As indicated, said bis (3-trialkoxysilylalkyl) polysulfide coupling agent has an average of from 2 to about 4 connecting sulfur atoms in its polysulfidic bridge wherein it may alternately contain an average of from about 2 to about 2.6 and further alternately an average of from about 3.4 to about 3.8, connecting sulfur atoms in its polysulfidic bridge.

Representative examples of various organoalkoxymercaptosilanes for said pre-hydrophobation of said precipitated silica may be, for example and without limitation, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

The precipitated silica for the reinforcing filler is a synthetic amorphous silica such as, for example, obtainable by the acidification of a soluble silicate (e.g., sodium silicate or a co-precipitation of a silicate and an aluminate) and pre-hydrophobated with an alkoxyorganomercaptosilane. Representative of such pre-hydrophobated precipitated silicas are understood to be, for example, selected from an Agilion™ 400, 454 and 458 from PPG Industries.

It is readily understood by those having skill in the art that the rubber of the tire tread would be compounded with conventional compounding ingredients including precipitated silica, as hereinbefore mentioned, in combination with a silica coupling agent, as well as antidegradant(s), processing oil if appropriate, fatty acid primarily comprised of, for example, stearic, palmitic and oleic acids which may also possibly contain linolenic acid, zinc oxide, sulfur and one or more sulfur vulcanization accelerator(s).

Processing aids may be used, if appropriate, for example, waxes such as microcrystalline and paraffinic waxes, in a range, for example, of about 1 to 5 phr or about 1 to about 3 phr; and resins may be used if appropriate, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the aforesaid sulfur would be used in combination with a sulfur vulcanization accelerator(s). The ingredients, including the elastomers but exclusive of sulfur and accelerator curatives, are normally first mixed together in at least one sequential mixing stages to a temperature in a range of, for example, about 145° C. to about 185° C., and such mixing stage(s) are typically referred to as non-productive mixing stage(s). Thereafter, the sulfur and accelerators, and possibly one or more retarders, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form an uncured tire component such as, for example, a tread strip. Such uncured tire tread strip is then typically built as a component of a sulfur curable tire carcass and the assembly thereof cured in a suitable mold under conditions of elevated temperature and pressure by methods well-known to those having skill in such art.

The following Example is provided for evaluating use of the fibrillated aramid fiber micropulp in a natural rubber/functionalized rubber composition which contains reinforcing filler comprised of pre-hydrophobated precipitated silica. The parts and percentages are by weight unless otherwise indicated.

EXAMPLE I

Rubber samples were prepared to evaluate an effect of an inclusion of fibrillated aramid fiber micropulp in a rubber composition containing a combination of natural cis 1,4-polyisoprene rubber and functionalized styrene/butadiene elastomer which contains reinforcing filler comprised of pre-hydrophobated precipitated silica.

Control rubber Sample A is comprised of natural rubber and functionalized styrene/butadiene rubber (functionalized SBR) containing reinforcing filler comprised of precipitated silica and coupling agent together with a small amount of rubber reinforcing carbon black.

Comparative rubber Sample B is comprised of natural rubber and functionalized styrene/butadiene rubber (functionalized SBR) containing reinforcing filler comprised of pre-hydrophobated precipitated silica together with a small amount of rubber reinforcing carbon black.

Experimental rubber Samples C, D and E are comprised of natural rubber and functionalized styrene/butadiene rubber (functionalized SBR) containing reinforcing filler comprised of pre-hydrophobated precipitated silica together with a small amount of rubber reinforcing carbon black and containing gradually increasing amounts of fibrillated aramid micropulp.

The general rubber formulation for the rubber Samples is reported in the following Table 1 where the parts are by weight unless otherwise indicated.

The rubber composition was prepared in two sequential mixing steps, or stages.

The first mixing step was a non-productive mixing step (NP) with ingredients not including sulfur and sulfur curing accelerators to a temperature of about 160° C. in an internal rubber mixer. The rubber mixture was removed (dumped) from the mixer, allowed to cool somewhat. In the subsequent mixing step, usually termed a productive mixing step (P), sulfur and sulfur cure accelerators were mixed with the rubber composition to a temperature of about 110° C. in an internal rubber mixer.

TABLE 1

| Material | Parts by Weight (phr) |
| --- | --- |
| Non Productive mixing step (NP1) | |
| Natural rubber (cis 1,4-polyisoprene)[1] | 50.2, 46.9, 33.5, 16.7 |
| Functionalized styrene/butadiene rubber[2] | 49.8 |
| Pre-hydrophobated precipitated silica[3] | 0, 68 |
| Precipitated silica[4] | 65, 0 |
| Silica coupler[5] | 0, 5.2 |
| Rubber reinforcing carbon black (N234)[6] | 5.2 |
| Fibrillated micropulp/natural rubber composite[7] | 0, 4.3, 21.7, 43.5 |
| Net fibrillated aramid fiber micropulp (23%) | 0, 1, 5, 10 |
| Petroleum based rubber processing oil | 20 |
| Antioxidant | 2 |
| Zinc oxide | 1.5 |
| Fatty acids[8] | 3 |
| Wax, microcrystalline and paraffinic | 1.5 |
| Productive mixing step (P) | |
| Sulfur | 1.5 |
| Sulfur cure accelerators[9] | 2.5 |
| Zinc oxide | 1.5 |

[1]Freely added natural rubber to the rubber composition
[2]Syrene/butadiene rubber (SBR), tin coupled, containing end functional groups comprised of at least one of siloxy and thiol groups as Sprintan™ SLR 4602 from Trinseo
[3]Pre-hydrophobated precipitated silica as precipitated silica pre-reacted with an alkoxyorganomercaptosilane, which may also contain a fatty acid, as Agilon 400™ from PPG
[4]Precipitated silica as Zeosil™ 1165 from Solvay
[5]Silica coupler as Si266™ from Evonik as a bis(3-triethoxysilylpropyl) polysulfide having an average of from about 2 to about 2.6 connecting sulfur atoms in its polysulfidic bridge
[6]N234, an ASTM designation for the rubber reinforcing carbon black
[7]Composite as a masterbatch comprised of 23 parts by weight of the micropulp dispersed in 100 parts by weight natural rubber as Kevlar™ Micropulp from Dupont. Micropulp is reported in Table 1 as the micropulp itself in amounts of 0, 1, 5 and 10 parts, respectively, thereof. The natural rubber of the composite plus the freely added natural rubber adds up to 50.2 parts by weight of natural rubber for each of the rubber Samples reported in Table 1.
[8]Fatty acids comprised of stearic, palmitic and oleic acids
[9]Sulfur cure accelerator(s) as sulfenamide and diphenylguanidene The following Table 2 represents the uncured and cure behavior and various physical properties of the rubber compositions based upon the basic formulation of Table 1, and reported as rubber Control rubber Samples A and Experimental rubber Samples B, C and D.

Test samples were cured for rubber samples, most of which were cured for about an effective of 32 minutes at about 150° C.

TABLE 2

| | Samples | | | | |
| --- | --- | --- | --- | --- | --- |
| | A | B | C | D | E |
| Fibrillated aramid fiber Micropulp | 0 | 0 | 1 | 5 | 10 |
| Rubber reinforcing carbon black | 5.2 | 5.2 | 5.2 | 5.2 | 5.2 |
| Pre-hydrophobated silica | 0 | 68 | 68 | 68 | 68 |
| Precipitated silica | 65 | 0 | 0 | 0 | 0 |
| Silica coupler | 5.2 | 0 | 0 | 0 | 0 |
| Natural rubber, total added | 50.2 | 50.2 | 50.2 | 50.2 | 50.2 |
| Functionalized SBR | 49.8 | 49.8 | 49.8 | 49.8 | 49.8 |
| Properties | | | | | |
| RPA test (Rubber Process Analyzer), | | | | | |
| Storage Modulus (G') | | | | | |

TABLE 2-continued

| | Samples | | | | |
|---|---|---|---|---|---|
| | A | B | C | D | E |
| Cured G', 1% strain, 1 Hertz, 100° C., kPa | 1762 | 937 | 901 | 1009 | 1461 |
| Cured G', 9% strain, 1 Hertz, 100° C., kPa | 1374 | 840 | 804 | 879 | 1143 |
| Tan Delta, 1% strain, 1 Hertz, 100° C. | 0.095 | 0.066 | 0.067 | 0.058 | 0.072 |
| Tan Delta, 9% strain, 1 Hertz, 100° C. | 0.093 | 0.076 | 0.083 | 0.070 | 0.084 |
| Stress-strain test | | | | | |
| 300% modulus, (MPa) | 10.2 | 10.3 | 9.8 | 11.6 | 15.5 |

From Table 2 it is seen that use of precipitated silica and silica coupler (rubber Sample A) instead of pre-hydrophobated precipitated silica (rubber Sample B) resulted in significantly increased 1 and 9 percent strains and increased tan delta properties for the rubber composition.

From Table 2 it is also seen that addition of the fibrillated aramid micropulp (gradual additions for rubber Samples C, D and E) resulted in a significant increase in the aforesaid strain property above 1 percent micropulp addition, together with beneficial reduction in tan delta properties over the range of 1 and 9 percent strains for the additions of 1 to 10 phr of micropulp.

From Table 2, it is also seen that addition of 5 to 10 phr of the micropulp increased the 300 percent modulus property of the rubber composition.

It is concluded that it is shown that an addition of from 1 to at least 10 phr, and apparently particularly from about 3 to about 10 phr of the micropulp is a significant contribution to the storage modulus G' in a range from about 1 to about 9 percent and the tan delta property of the rubber composition.

While certain representative embodiments and details have been shown for the purpose of illustrating the invention, it will be apparent to those skilled in this art that various changes and modifications may be made therein without departing from the spirit or scope of the invention.

What it claimed is:

1. A rubber composition is provided comprised of, based on parts by weight per 100 parts by weight rubber (phr):
   (A) at least one conjugated diene-based elastomer,
   (B) rubber reinforcement comprised of:
      (1) about 0.1 to about 20 phr of fibrillated aramid fiber micropulp, and
      (2) about 40 to about 120 phr of reinforcing filler comprised of rubber reinforcing carbon black and pre-hydrophobated precipitated silica comprised of from about 3 to about 45 phr of said rubber reinforcing carbon black;
      wherein said pre-hydrophobated precipitated silica is precipitated silica pre-reacted with at least one of bis(3-trialkoxysilylalkyl) polysulfide having an average of from 2 to about 4 connecting sulfur atoms in its polysulfidic bridge, and alkoxyorganomercaptosilane and optionally an alkylsilane;
      wherein said fibrillated aramid fiber micropulp has a volume average length in a range of from about 0.01 to about 100 mm (micrometers) and an average surface area in a range of from about 15 to about 500 square meter per gram.

2. The rubber composition of claim 1 wherein said bis(3-trialkoxysilylorgano) polysulfide is comprised of bis (3-triethoxysilylpropyl) polysulfide.

3. The rubber composition of claim 1 wherein said reinforcing filler contains up to about 50 percent precipitated silica.

4. The rubber composition of claim 1 wherein said reinforcing filler is comprised of up to about 20 percent of precipitated silica wherein said pre-hydrophobated precipitated silica is precipitated silica pre-treated with said alkoxyorganomercaptosilane and both of said precipitated silica and said pre-hydrophobated precipitated silica are hydrophobated in situ within the rubber composition with said bis(3-trialkoxysilylorgano) polysulfide.

5. The rubber composition of claim 1 wherein said pre-hydrophobated precipitated silica is a precipitated silica pre-treated with an organoalkoxymercaptosilane.

6. The rubber composition of claim 1 wherein said pre-hydrophobated precipitated silica is a precipitated silica pre-treated with at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

7. The rubber composition of claim 3 wherein said pre-hydrophobated precipitated silica is a precipitated silica pre-treated with an organoalkoxymercaptosilane and said bis(3-trialkoxysilylorgano) polysulfide is a bis(3-trialkoxysilylpropyl) polysulfide having an average of from about 2 to about 4 connecting sulfur atoms in its polysulfidic bridge.

8. The rubber composition of claim 3 wherein said pre-hydrophobated precipitated silica is a precipitated silica pre-treated with at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

9. A tire having a component comprised of the rubber composition of claim 1.

10. A tire having a component comprised of the rubber composition of claim 2.

11. A tire having a component comprised of the rubber composition of claim 3.

12. A tire having a component comprised of the rubber composition of claim 4.

13. A tire having a component comprised of the rubber composition of claim 5.

14. A tire having a component comprised of the rubber composition of claim 6.

15. A tire having a component comprised of the rubber composition of claim 7.

16. A tire having a component comprised of the rubber composition of claim 8.

17. A tire having a tread comprised of the rubber composition of claim 1.

18. A tire having a tread comprised of the rubber composition of claim 2.

19. A tire having a tread comprised of the rubber composition of claim 3.

20. A tire having a tread comprised of the rubber composition of claim 4.

* * * * *